(12) United States Patent
Noh

(10) Patent No.: US 11,872,936 B2
(45) Date of Patent: Jan. 16, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventor: Jung Uk Noh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 449 days.

(21) Appl. No.: 17/306,518

(22) Filed: May 3, 2021

(65) Prior Publication Data

US 2022/0118905 A1 Apr. 21, 2022

(30) Foreign Application Priority Data

Oct. 20, 2020 (KR) .......................... 10-2020-0135864

(51) Int. Cl.
*B60Q 5/00* (2006.01)
*H04R 1/02* (2006.01)

(52) U.S. Cl.
CPC ............... *B60Q 5/005* (2013.01); *H04R 1/02* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 2010/0245069 A1* | 9/2010 | Noro ...................... | B60Q 5/008 340/441 |
| 2014/0254815 A1* | 9/2014 | Fulton .................... | G10K 11/26 381/71.4 |
| 2020/0245060 A1* | 7/2020 | Goller .................... | H04R 1/345 |

* cited by examiner

*Primary Examiner* — James J Lee
*Assistant Examiner* — Jonathan E Reinert
(74) *Attorney, Agent, or Firm* — Slater Matsil, LLP

(57) ABSTRACT

A vehicle includes: a housing; a passive radiator disposed on a rear surface of the housing; an active speaker disposed on a front surface of the housing and configured to output a virtual engine sound; a partition wall disposed inside the housing such that one side is in contact with the left side surface of the housing and the other side is in contact with the right side surface of the housing; a driver configured to move and rotate the partition wall; and a controller configured to control the driver based on at least one of a transmission position of the vehicle and a speed of the vehicle.

20 Claims, 6 Drawing Sheets

VEHICLE AND CONTROL METHOD THEREOF

CROSS-REFERENCE TO RELATED APPLICATION

This application is based on and claims priority under 35 U.S.C. § 119 to Korean Patent Application No 10-2020-0135864, filed on Oct. 20, 2020, the disclosure of which is incorporated herein by reference in its entirety.

TECHNICAL FIELD

The present disclosure relates to a vehicle and a control method thereof, and more particularly, to a vehicle capable of reducing noise radiated into the vehicle when a virtual engine sound is output, and a control method thereof.

BACKGROUND

Electric vehicles (EV, HEV, PHEV, etc.) driven by electric motors have little engine noise, so when moving at a low speed or moving backward, there is a high risk of a collision accident as pedestrians do not recognize the vehicle.

Accordingly, when a vehicle moves at a low speed or moves backward, a technology has been developed to output a virtual engine sound through an active speaker so that a pedestrian can recognize the vehicle.

Since the active speaker that outputs the virtual engine sound is used only when the output condition of the virtual engine sound is satisfied, it is accommodated in a single housing with a passive radiator, and is used to output various sounds inside the vehicle through passive radiator.

However, when the virtual engine sound is output, when the opposite phase sound radiated to the rear side of the active speaker passes through the passive radiator, noise is transmitted inside the vehicle, which may cause discomfort to passengers.

SUMMARY

Therefore, it is an aspect of the present disclosure to provide a vehicle for reducing noise that may be introduced into the vehicle through a passive radiator when a virtual engine sound is output through an active speaker, and a control method thereof.

In accordance with one aspect of the disclosure, a vehicle includes: a housing; a passive radiator disposed on the rear surface of the housing; an active speaker disposed on the front surface of the housing and configured to output a virtual engine sound; a partition wall disposed inside the housing such that one side is in contact with the left side surface of the housing and the other side is in contact with the right side surface of the housing; a driver configured to move and rotate the partition wall; and a controller configured to control the driver based on at least one of a transmission position of the vehicle and a speed of the vehicle.

The controller may be configured to control the driver so that the gap through which air flows is narrowed between the passive radiator and the active speaker when the transmission of the vehicle is located on the R stage, and control the driver so that the gap through which air flows is widened between the passive radiator and the active speaker when the transmission of the vehicle is not located on the R stage.

The controller may be configured to control the driver so that the distance between the partition wall and the active speaker becomes a preset distance on the central axis of the active speaker when the transmission of the vehicle is located on the R stage, and the preset distance may be set to ¼ wavelength or more of the lowest frequency of the virtual engine sound.

The controller may be configured to control the driver so that the minimum distance between the partition wall and the front surface of the housing becomes a preset distance when the transmission of the vehicle is located on the R stage, and the preset distance may be set to ¼ wavelength or less of the highest frequency of the virtual engine sound.

The controller may be configured to control the driver so that the gap through which air flows is narrowed between the passive radiator and the active speaker when the vehicle speed is a preset speed or less, and control the driver so that the gap through which air flows is widened between the passive radiator and the active speaker when the vehicle speed is greater than the preset speed.

The controller may be configured to control the driver so that the distance between the partition wall and the active speaker becomes a preset distance on the central axis of the active speaker when the vehicle speed is a preset speed or more, and the preset distance may be set to ¼ wavelength or more of the lowest frequency of the virtual engine sound.

The controller may be configured to control the driver so that the minimum distance between the partition wall and the front surface of the housing becomes a preset distance when the vehicle speed is a preset speed or more, and the preset distance may be set to ¼ wavelength or less of the highest frequency of the virtual engine sound.

The vehicle may further include: a transfer rail installed inside the housing and configured to move the partition wall based on the power transmitted from the driver; and a holder having one end rotatably fixed to the partition wall and the other end rotatably fixed to the inside of the housing.

The vehicle may further include: a transfer rail installed inside the housing; and a holder having one end rotatably fixed to the partition wall and the other end rotatably fixed to the inside of the housing, and configured to lift the partition wall based on the power transmitted from the driver.

The partition wall may have a thickness of 10 mm or more.

In accordance with one aspect of the disclosure, a control method of a vehicle including a housing; a passive radiator disposed on the rear surface of the housing; an active speaker disposed on the front surface of the housing and configured to output a virtual engine sound; and a partition wall disposed inside the housing such that one side is in contact with the left side surface of the housing and the other side is in contact with the right side surface of the housing, the method includes: moving and rotating the partition wall based on at least one of a transmission position of the vehicle and a speed of the vehicle.

The moving and rotating the partition wall may include: moving and rotating the partition wall so that the gap through which air flows is narrowed between the passive radiator and the active speaker when the transmission of the vehicle is located on the R stage; and moving and rotating the partition wall so that the gap through which air flows is widened between the passive radiator and the active speaker when the transmission of the vehicle is not located on the R stage.

The moving and rotating the partition wall may include: the moving and rotating the partition wall so that the distance between the partition wall and the active speaker becomes a preset distance on the central axis of the active speaker when the transmission of the vehicle is located on the R stage, and the preset distance may be set to ¼ wavelength or more of the lowest frequency of the virtual engine sound.

The moving and rotating the partition wall may include: the moving and rotating the partition wall so that the minimum distance between the partition wall and the front surface of the housing becomes a preset distance when the transmission of the vehicle is located on the R stage, and the preset distance may be set to ¼ wavelength or less of the highest frequency of the virtual engine sound.

The moving and rotating the partition wall may include: moving and rotating the partition wall so that the gap through which air flows is narrowed between the passive radiator and the active speaker when the vehicle speed is a preset speed or less; and moving and rotating the partition wall so that the gap through which air flows is widened between the passive radiator and the active speaker when the vehicle speed is greater than the preset speed.

The moving and rotating the partition wall may include: moving and rotating the partition wall so that the distance between the partition wall and the active speaker becomes a preset distance on the central axis of the active speaker when the vehicle speed is a preset speed or more, and the preset distance may be set to ¼ wavelength or more of the lowest frequency of the virtual engine sound.

The moving and rotating the partition wall may include: moving and rotating the partition wall so that the minimum distance between the partition wall and the front surface of the housing becomes a preset distance when the vehicle speed is a preset speed or more, and the preset distance may be set to ¼ wavelength or less of the highest frequency of the virtual engine sound.

The vehicle may further include: a transfer rail installed inside the housing and configured to move the partition wall based on the power transmitted from the driver; and a holder having one end rotatably fixed to the partition wall and the other end rotatably fixed to the inside of the housing, and the moving and rotating the partition wall may include: controlling the driver to provide power to the transfer rail.

The vehicle may further include: a transfer rail installed inside the housing; and a holder having one end rotatably fixed to the partition wall and the other end rotatably fixed to the inside of the housing, and configured to lift the partition wall based on the power transmitted from the driver, and the moving and rotating the partition wall may include: controlling the driver to provide power to the holder.

The partition wall may have a thickness of 10 mm or more.

DRAWINGS

These and/or other aspects of the disclosure will become apparent and more readily appreciated from the following description of the forms, taken in conjunction with the accompanying drawings of which:

DETAILED DESCRIPTION

Figure 1:
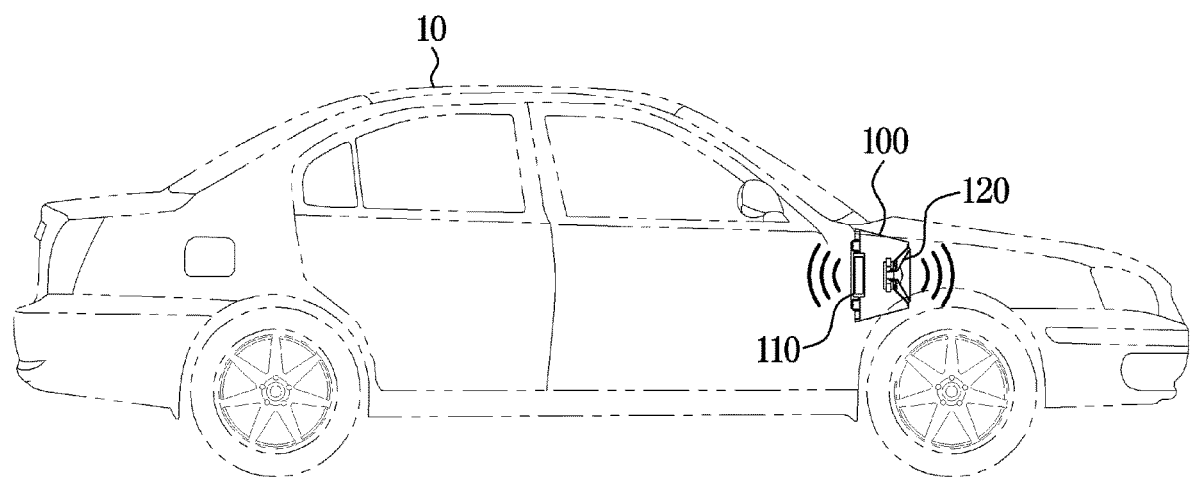
FIG. 1 is a view illustrating a vehicle in one form of the present disclosure.

Like reference numerals refer to like elements throughout the specification. Not all elements of forms of the disclosure will be described, and description of what are commonly known in the art or what overlap each other in the forms will be omitted.

Reference will now be made in detail to various forms of the present disclosure(s), examples of which are illustrated in the accompanying drawings and described below. While the present disclosure(s) will be described in conjunction with exemplary forms of the present disclosure, it will be understood that the present description is not intended to limit the present disclosure(s) to those exemplary forms. On the other hand, the present disclosure(s) is/are intended to cover not only the exemplary forms of the present disclosure, but also various alternatives, modifications, equivalents and other forms, which may be included within the spirit and scope of the present disclosure as defined by the appended claims.

In the following description, like reference numerals refer to like elements throughout the specification. This specification does not describe all elements of the forms, and in the technical field to which an exemplary form of the present disclosure pertains, there is no overlap between the general contents or the forms. Terms such as "unit", "module", "member", and "block" may be embodied as hardware or software. According to forms, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, forms of the present disclosure will be described with reference to the accompanying drawings.

FIG. 1 is a view illustrating a vehicle in one form of the present disclosure.

Referring to FIG. 1, a vehicle 10 in one form of the present disclosure may include a housing 100 accommodating an active speaker 120 and a passive radiator 110.

The active speaker 120 may output a virtual engine sound and/or a low frequency band sound corresponding to a sound output inside the vehicle 10.

Specifically, the active speaker 120 can output a virtual engine sound under conditions requiring the attention of pedestrians, such as when the speed of the vehicle 10 is the preset speed or less or the gear of the vehicle 10 is located in the R stage.

In this case, the preset speed may be set to a speed that is a reference for low-speed driving, for example, may be set to 30 km/h, but is not limited thereto.

The sound source of the virtual engine sound can be composed of a high frequency band so that pedestrians can easily recognize it. For example, the frequency band of the virtual engine sound may be 300 Hz~4000 Hz.

In addition, the active speaker 120 may output a driving sound corresponding to the low frequency band sound of various sounds output inside the vehicle 10, and the passive radiator 110 may resonate according to the driving sound output from the active speaker 120 and output a low frequency band sound.

As such, the passive radiator 110 is an auxiliary low-frequency generator, also referred to as an auxiliary bass radiator (ABR). The passive radiator 110 is a flat speaker unit that does not have a voice coil or magnetic structure, and it cannot produce sound by itself, but it may output a low sound by operating in response to the air pressure inside the housing 100 changed by the driving sound.

The housing 100 in some forms of the present disclosure may be provided without limitation at a location that allows a pedestrian to effectively recognize the virtual engine sound output from the active speaker 120, and the housing 100 may serve as an enclosure for the active speaker 120 and the passive radiator 110.

For example, the housing 100 may be provided at the rear of the front bumper or grill of the vehicle 10, but is not limited thereto.

Hereinafter, for convenience of description, the surface to which the active speaker 120 is attached is defined as the front surface of the housing 100 and the surface to which the passive radiator 110 is attached is defined as the rear surface of the housing 100. In this case, the front surface of the housing 100 may mean a surface facing the outside of the vehicle 10, and the rear surface of the housing 100 may mean a surface facing the inside of the vehicle 10.

Figure 2:
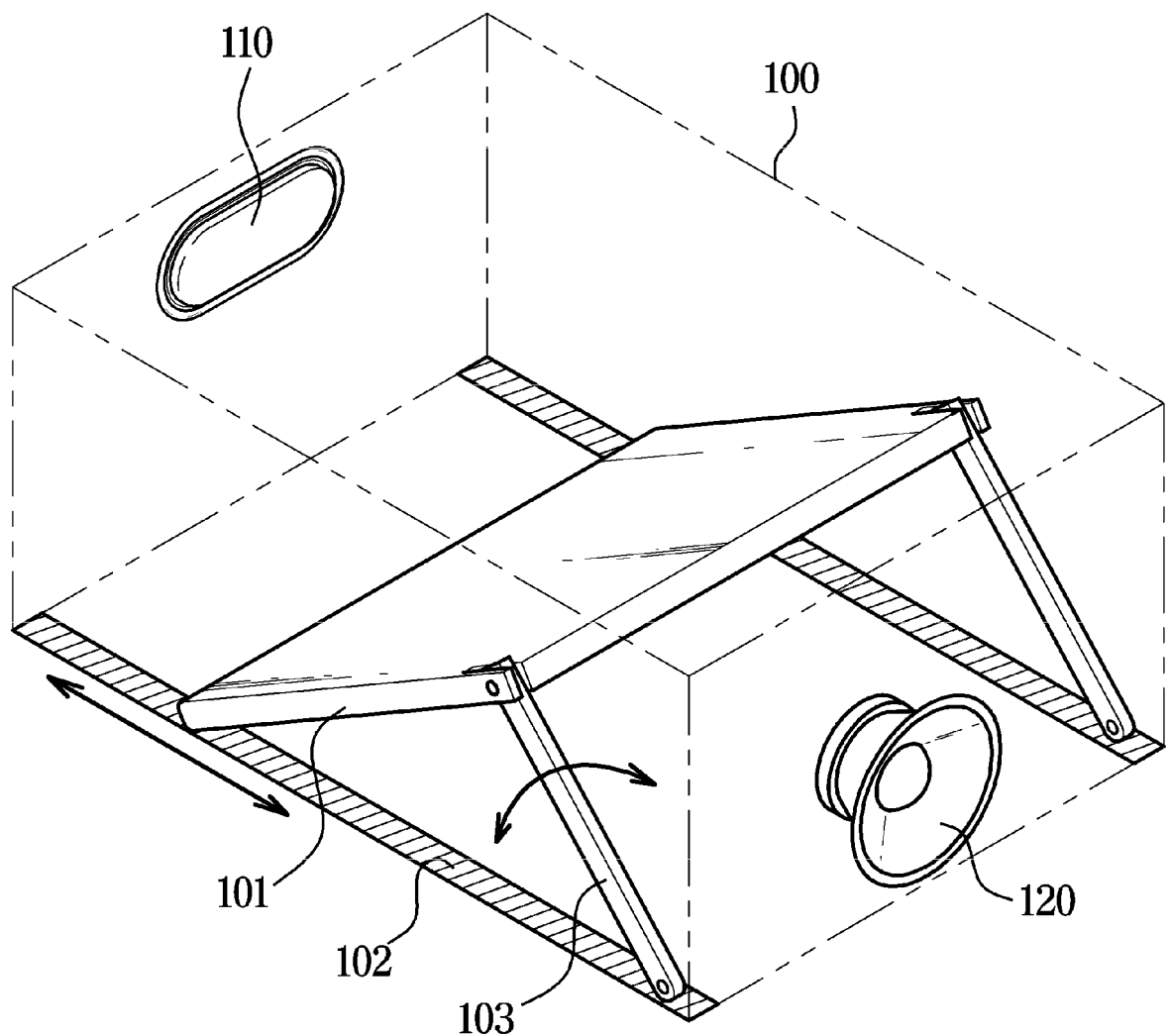
FIG. 2 is a view illustrating the internal structure of a housing provided in a vehicle in one form of the present disclosure.
Figure 3:
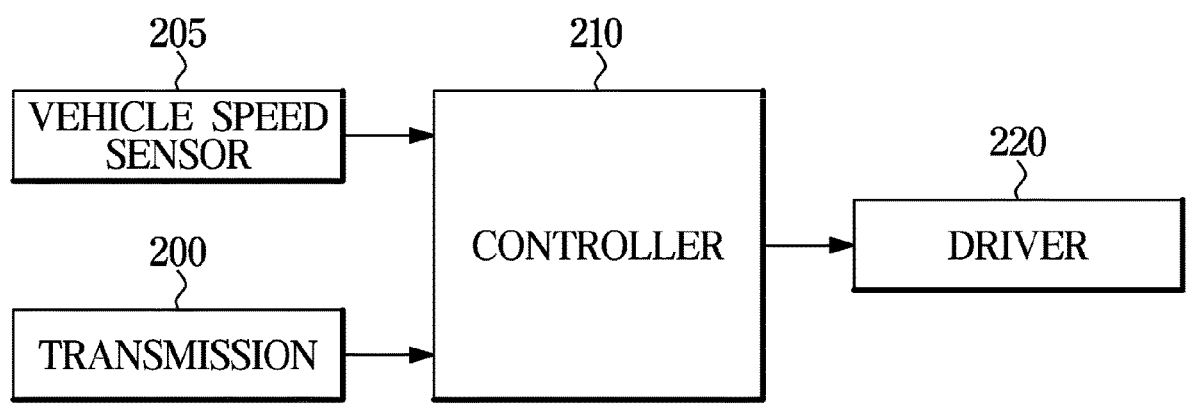
FIG. 3 is a control block diagram of a vehicle in one form of the present disclosure.

FIG. 2 is a view illustrating the internal structure of a housing provided in a vehicle in some forms of the present disclosure. FIG. 3 is a control block diagram of a vehicle in some forms of the present disclosure.

Referring FIGS. 2 and 3, the passive radiator 110 may be disposed on the rear surface of the housing 100, and the active speaker 120 may be disposed on the front surface of the housing 100.

A partition wall 101 may be disposed inside the housing 100 so that one side is in contact with the left side surface of the housing 100 and the other side is in contact with the right side surface of the housing 100.

When a virtual engine sound is output from the active speaker 120, a phase sound opposite to the virtual engine sound may be radiated into the housing 100.

The partition wall 101 may block the phase sound opposite to the virtual engine sound radiated into the housing 100 from reaching the passive radiator 110.

To this end, the partition wall 101 may be made of a plastic injection material such as high density Acrylonitrile, Butadiene, Styrene (ABS) or Polyamide (PA), and may be manufactured with a thickness of at least 10 mm or more in order to efficiently prevent sound waves and prevent internal resonance.

A transfer rail 102 may be installed inside the housing 100 to move the partition wall 101 in the front surface direction or the rear surface direction of the housing 100.

In this case, a part of the partition wall 101 may be in contact with the transfer rail 102.

The transfer rail 102 may move the partition wall 101 in the front surface direction or the rear surface direction of the housing 100 based on the driving force provided from the driver 220, and may move the partition wall 101 in the front surface direction or the rear surface direction of the housing 100 in response to a horizontal force applied to the partition wall 101.

As the transfer rail 102, various configurations may be adopted that allow the partition wall 101 to be moved even when a small force is applied to the partition wall 101. For example, the transfer rail 102 may be composed of a plurality of rollers. When a force in the horizontal direction acts on the partition wall 101 due to the transfer rail 102, the partition wall 101 can be easily moved in the horizontal direction.

When the transfer rail 102 moves the partition wall 101 based on the driving force provided from the driver 220, the transfer rail 102 may be made of a material having strong friction or may include a fixing part capable of fixing a part of the partition wall 101.

That is, the transfer rail 102 can serve as a conveyor of the conveyor system.

In addition, a holder 103 for lifting one end of the partition wall 101 in the upper surface direction of the housing 100 may be installed inside the housing 100.

One end of the holder 103 may be fixed to the partition wall 101 so as to be rotatable, and the other end may be fixed to the inside of the housing 100 so as to be rotatable.

Similarly, the holder 103 may lift the partition wall 101 in the upper surface direction of the housing 100 or lower in the lower surface direction based on the driving force provided from the driver 220, and may lift the partition wall 101 in the upper surface direction of the housing 100 or lower in the lower surface direction in response to a horizontal force applied to the partition wall 101.

At least one of the transfer rail 102 or the holder 103 may receive a driving force from the driver 220, and the partition wall 101 may be moved and rotated based on this driving force.

That is, the driver 220 may move and rotate the partition wall 101.

Specifically, when the driver 220 provides a driving force to the transfer rail 102 so that a part of the partition wall 101 is moved in the front surface direction, part of the partition wall 101 can be lifted to the top by rotating both ends of the holder 103 in order to balance the force.

As another example, when the driver 220 provides driving force to the holder 103 so that the holder 103 rotates clockwise, a force in the front surface direction of the housing 100 can act on the partition wall 101, and a part of the partition wall 101 can be easily moved in the front surface direction of the housing 100 along the transfer rail 102.

The configuration for moving and rotating the partition wall 101 is not limited to the above-described example, and various techniques within the scope of a conventional technology may be adopted.

In this way, the driver 220 may move and rotate the partition wall 101 based on the control signal of the controller 210.

Specifically, the driver 220 may include a driving motor that generates driving force in various configurations for moving and rotating the partition wall 101 and a driving circuit that supplies driving power to the driving motor according to a control signal from the controller 210.

The driving motor may receive driving power from a driving circuit and convert the supplied driving power into rotational force. In some forms of the present disclosure, the holder 103 can be rotated by the converted rotational force, and the transfer rail 102 can be moved in the horizontal direction by the converted rotational force.

For example, the rotational force generated by the driving motor may be transmitted to the holder 103 and/or the transfer rail 102 through a gear or the like. In other words, the driving motor may rotate the holder 103 or move the transfer rail 102 through a gear or the like.

As another example, the rotational force generated by the driving motor may be transmitted to the holder 103 and/or the transfer rail 102 through a fluid and a piston.

Such a driving circuit may include a switching element such as a relay for supplying driving power to the driving motor or cutting off the driving power.

The controller 210 in some forms of the present disclosure may control the driver 220 based on at least one of the position of the transmission 200 of the vehicle 10 and the speed of the vehicle 10.

That is, the controller 210 may change the position of the partition wall 101 by receiving information on the position of the transmission 200 of the vehicle 10 and vehicle speed information, and controlling the driver 220 based on this.

The controller 210 may include at least one memory in which a program for performing the above-described operation and an operation described later is stored, and at least one processor that executes the stored program. When the controller 210 includes a plurality of memories and a plurality of processors, a plurality of memories and a plurality of processors may be integrated into one chip or may be physically separated.

The vehicle speed sensor 205 may obtain speed information of the vehicle 10 and transmit the obtained speed information to the controller 210.

In addition, the transmission 200 may transmit the position information of the gear to the controller 210.

In this case, a controller area network (CAN) communication method may be used to transmit various types of information. That is, for control of various electric loads mounted on the vehicle 10 and communication between various electric loads, in the vehicle 10, a communication network including a body network, a multimedia network, and a chassis network is configured, and each of the networks separated from each other in this way may be connected by the controller 210 in order to transmit and receive CAN communication messages between each other.

In the above, the structure of the housing 100 included in the vehicle 10 and various configurations for moving and rotating the partition wall 101 inside the housing 100 have been described.

Hereinafter, a control method of the vehicle 10 using the above configurations will be described in detail.

Figure 4:
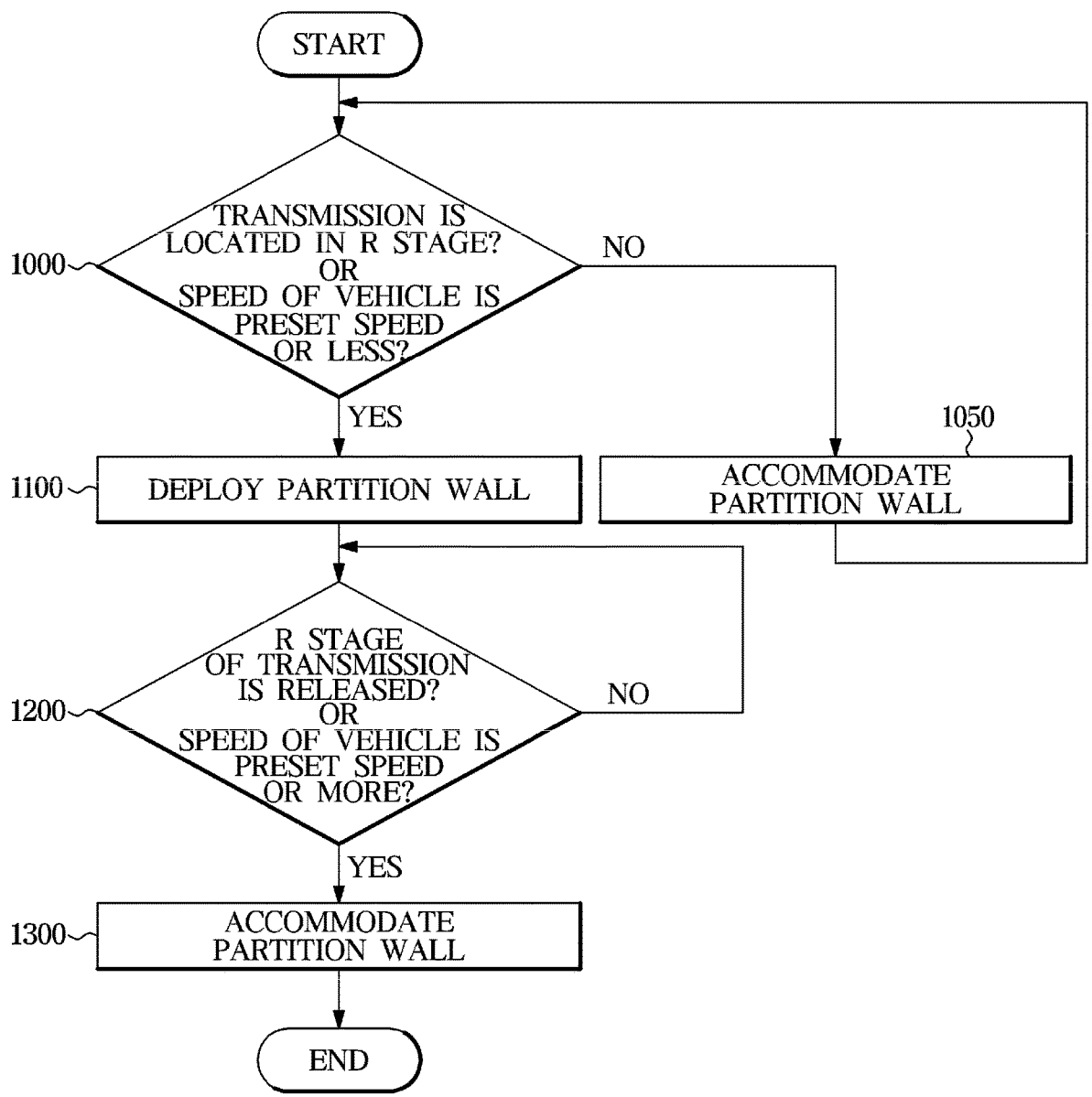
FIG. 4 is a flowchart illustrating a vehicle control in one form of the present disclosure.
Figure 5:
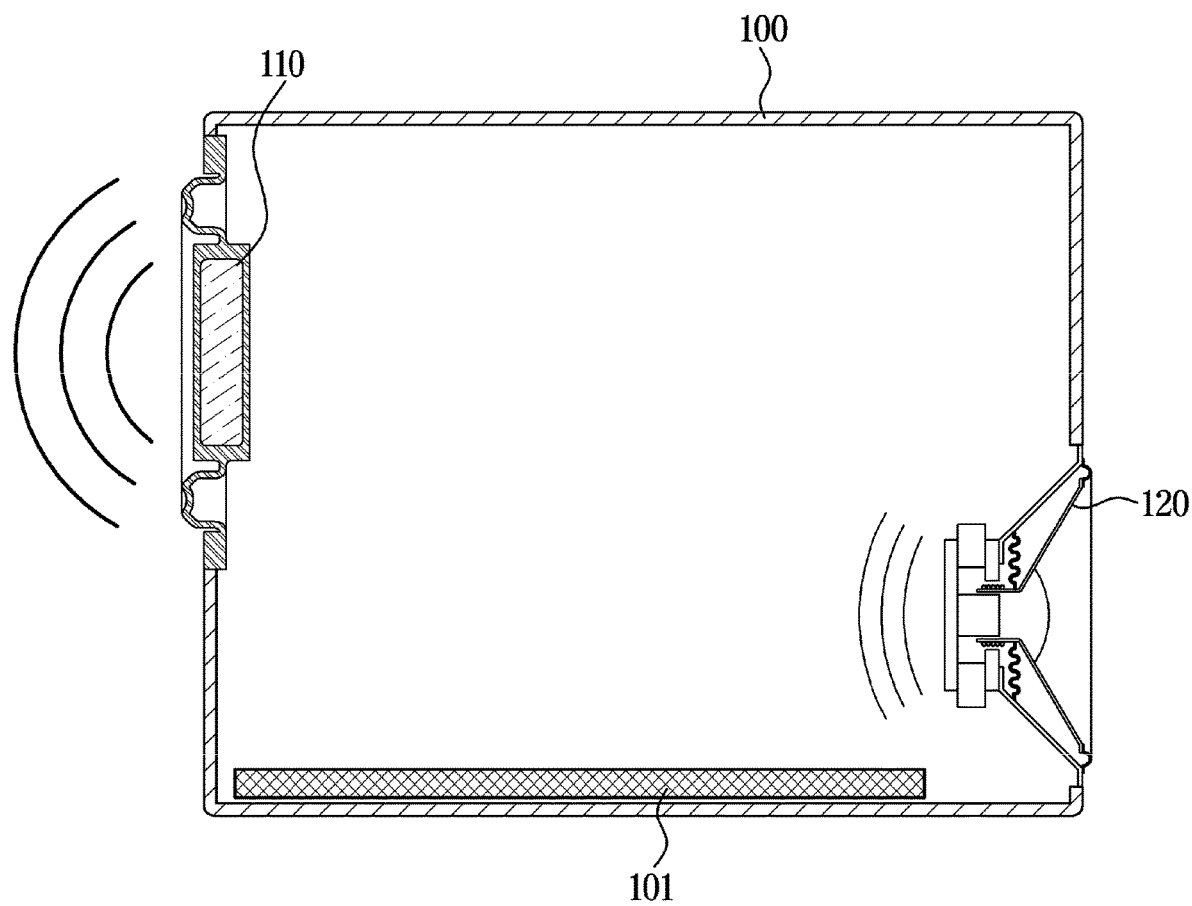
FIG. 5 shows a state in which a partition wall inside a housing provided in a vehicle in one form of the present disclosure is accommodated.
Figure 6:
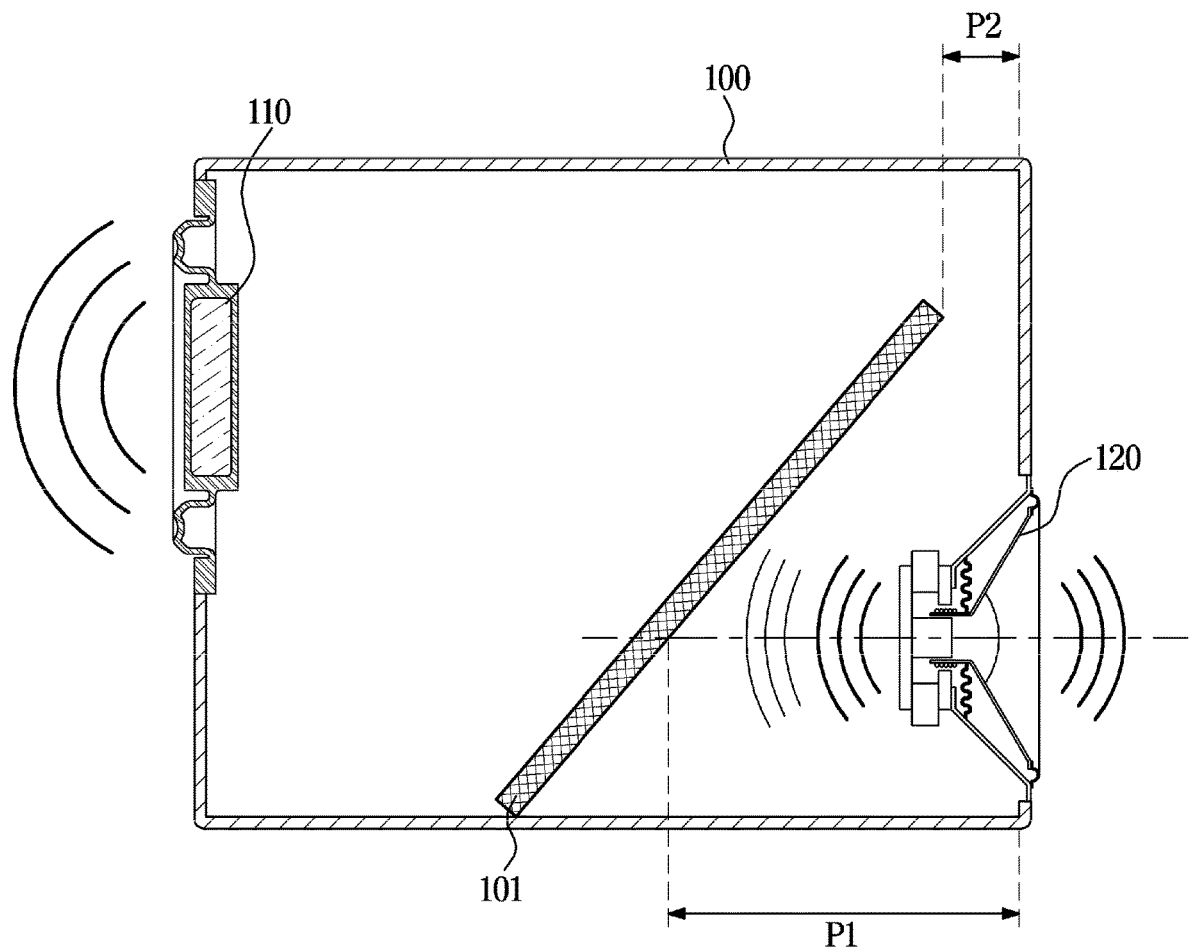
FIG. 6 shows a state in which a partition wall inside a housing provided in a vehicle in one form of the present disclosure is deployed.

FIG. 4 is a flowchart illustrating a vehicle control in some forms of the present disclosure. FIG. 5 shows a state in which a partition wall inside a housing provided in a vehicle in some forms of the present disclosure is accommodated. FIG. 6 shows a state in which a partition wall inside a housing provided in a vehicle in some forms of the present disclosure is deployed.

Referring to FIG. 4, when the transmission 200 of the vehicle 10 is not located in the R stage, and the vehicle speed is greater than the preset speed (No in 1000), the controller 210 may control the driver 220 so that the partition wall 101 inside the housing 100 is accommodated (1050).

Meaning that the partition wall 101 is accommodated may mean that the partition wall 101 is disposed so as not to interfere with the air flow between the active speaker 120 and the passive radiator 110.

Referring to FIG. 5, in a state in which the partition wall 101 is accommodated, the partition wall 101 may be disposed in contact with the lower surface. Accordingly, the driving sound output from the active speaker 120 can be efficiently transmitted to the passive radiator 110. However, the state in which the partition wall 101 is accommodated does not mean only the state in which the partition wall 101 is placed in contact with the lower surface, but may mean any form in which the partition wall 101 is arranged so as not to interfere with the air flow between the active speaker 120 and the passive radiator 110.

That is, when the active speaker 120 is not outputting the virtual engine sound, the controller 210 may accommodate the partition wall 101 so that the driving sound output from the active speaker 120 can be efficiently transmitted to the passive radiator 110.

Conversely, when the speed of the vehicle 10 is the preset speed or less when the transmission 200 of the vehicle 10 is located in the R stage or the transmission 200 of the vehicle 10 is located in the D range (YES in 1000), the controller 210 may control the driver 220 so that the partition wall 101 is deployed (1100).

This is because a virtual engine sound can be output from the active speaker 120 when the speed of the vehicle 10 is the preset speed or less when the transmission 200 of the vehicle 10 is located in the R stage or the transmission 200 of the vehicle 10 is located in the D range. The preset speed refers to a reference speed that is the reference for virtual engine sound output.

The meaning that the partition wall 101 is deployed may mean that the partition wall 101 is disposed to interfere with the air flow between the active speaker 120 and the passive radiator 110.

Referring to FIG. 6, when the partition wall 101 is deployed, the partition wall 101 may be inclined at a specific angle to surround the active speaker 120. Accordingly, the opposite phase sound of the virtual engine sound output from the active speaker 120 may not be transmitted to the passive radiator 110.

That is, when the active speaker 120 outputs the virtual engine sound, the controller 210 may deploy the partition wall 101 so that the opposite phase sound of the virtual engine sound output from the active speaker 120 is not transmitted to the passive radiator 110.

In some forms of the present disclosure, it is possible to prevent noise from being generated inside the vehicle 10 by outputting the opposite phase sound of the virtual engine sound into the vehicle 10 through the passive radiator 110.

Thereafter, when the R stage of the transmission 200 is released (YES in 1200), the controller 210 may control the driver 220 so that the partition wall 101 is accommodated again (1300).

Alternatively, the controller 210 controls the driver 220 so that the partition wall 101 is accommodated again (1300) when the speed of the vehicle 10 is greater than the preset speed in a state in which the transmission 200 is located in the D range (YES in 1200).

In this way, when the transmission 200 of the vehicle 10 is located in the R stage, the controller 210 controls the driver 220 so that the gap through which air can flow is narrowed between the passive radiator 110 and the active speaker 120. In addition, when the transmission 200 of the vehicle 10 is not located on the R stage, the controller 210 may control the driver 220 so that the gap through which air can flow is widened between the passive radiator 110 and the active speaker 120.

In addition, the controller 210 controls the driver 220 so that the gap through which air can flow is narrowed between the passive radiator 110 and the active speaker 120 when the speed of the vehicle 10 is the preset speed or less. In addition, when the speed of the vehicle 10 is greater than the preset speed, the controller 210 may control the driver 220 so that a gap through which air can flow is widened between the passive radiator 110 and the active speaker 120.

Hereinafter, the arrangement of the partition wall 101 in a state in which the partition wall 101 is deployed will be described in detail.

Referring back to FIG. 6, it can confirm the state in which the partition wall 101 is deployed. Hereinafter, for convenience of explanation, it is assumed that the frequency band of the sound source of the virtual engine sound is from the first frequency to the second frequency. In this case, the first frequency is the minimum frequency of the virtual engine sound, and the second frequency is the maximum frequency of the virtual engine sound.

Since the virtual engine sound mainly uses a high frequency band sound source, and the frequency band for driving the passive radiator 110 is a low frequency band, the first frequency is higher than the maximum frequency of the driving sound for driving the passive radiator 110.

The distance P1 between the partition wall 101 and the active speaker 120 on the central axis of the active speaker 120 may be preset according to the first frequency of the virtual engine sound. That is, the distance between the partition wall 101 and the active speaker 120 on the central axis of the active speaker 120 may be the first preset distance P1.

Specifically, the first preset distance P1 may be preferably set to ¼ wavelength or more of the first frequency.

For example, assuming that the first frequency is 300 Hz, the first preset distance P1 may be set to about 30 cm or more, which is a ¼ wavelength of 300 Hz. This can be derived by the relationship between the frequency, the wavelength and the speed of sound (341 m/s).

Specifically, a ¼ wavelength of 300 Hz may be derived as a value obtained by multiplying a value obtained by dividing the speed of sound by a frequency by ¼.

In addition, a minimum distance P2 between the partition wall 101 and the front surface of the housing 100 may be preset according to the second frequency when the partition wall 101 is deployed. That is, the minimum distance between the partition wall 101 and the front surface of the housing 100 may be the second preset distance P2.

In this case, the minimum distance between the partition wall 101 and the front surface of the housing 100 may mean the width of a gap formed between the partition wall 101 and the front surface of the housing 100.

Specifically, the second preset distance P2 may be preferably set to ¼ wavelength or less of the second frequency.

For example, assuming that the second frequency is 1000 Hz, the second preset distance P2 may be set to about 8 cm or less, which is a ¼ wavelength of 1000 Hz.

By arranging the partition wall 101 to satisfy the above condition, sound waves of a high frequency band are reflected by the partition wall 101 and energy transmitted to the opposite side of the partition wall 101 can be drastically reduced. However, sound waves of a low frequency band are hardly affected by the partition wall 101 and may be transmitted to the opposite side of the partition wall 101. Accordingly, a sound wave having a phase opposite to that of the virtual engine sound output from the active speaker 120 is blocked, and the driving sound output from the active speaker 120 may be transmitted to the passive radiator 110.

That is, if the transmission 200 of the vehicle 10 is located in the R stage or the speed of the vehicle 10 is the preset speed or more, the controller 210 may control the driver 220 so that the distance between the partition wall 101 and the active speaker 120 on the central axis of the active speaker 120 becomes a first preset distance P1. In this case, the first preset distance P1 may be set to be equal to or greater than ¼ wavelength of the lowest frequency of the sound source of the virtual engine sound.

In addition, when the transmission 200 of the vehicle 10 is located in the R stage or the speed of the vehicle 10 is the preset speed or more, the controller 210 controls the driver 220 so that the minimum distance between the partition wall 101 and the front surface of the housing 100 becomes a second preset distance P2. The second preset distance P2 may be set to ¼ wavelength or less of the highest frequency of the sound source of the virtual engine sound.

At least one memory included in the controller 210 may store information on a first preset distance P1 and information on a second preset distance P2. Alternatively, at least one memory included in the controller 210 may store control signal information to be transmitted to the driver 220 to make the distance between the partition wall 101 and the active speaker 120 on the central axis of the active speaker 120 become the first preset distance P1 and to make the minimum distance between the partition wall 101 and the front surface of the housing 100 become the second preset distance P2.

In some forms of the present disclosure, when a virtual engine sound is output, sound waves having a phase opposite to that of the virtual engine sound can be blocked and only the driving sound can be efficiently transmitted to the passive radiator 110.

According to the present disclosure, it is possible to improve passenger satisfaction by reducing noise introduced into a vehicle when a virtual engine sound is output through an active speaker.

On the other hand, the disclosed exemplary forms may be implemented in a form of a recording medium for storing instructions executable by a computer. Instructions may be stored in a form of program code and, when executed by a processor, may generate a program module to perform the operations of the disclosed exemplary forms. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary forms have been described with reference to the accompanying drawings. Although example forms of the present disclosure have been shown and described, it would be appreciated by those skilled in the art that changes may be made to these forms without departing from the principles and spirit of the present disclosure, the scope of which is defined in the claims and their equivalents.

What is claimed is:

1. A vehicle comprising:
a housing;

a passive radiator disposed on a rear surface of the housing;
an active speaker disposed on a front surface of the housing and configured to output a virtual engine sound;
a partition wall disposed inside the housing, wherein a first side of the partition wall is in contact with a left side surface of the housing and a second side of the partition wall is in contact with a right side surface of the housing;
a driver configured to move and rotate the partition wall; and
a controller configured to control the driver based on at least one of a transmission position of the vehicle or a vehicle speed.

2. The vehicle according to claim 1, wherein the controller is configured to:
control the driver to narrow a gap between the passive radiator and the active speaker when the transmission position of the vehicle is a R stage; and
control the driver to widen the gap between the passive radiator and the active speaker when the transmission position of the vehicle is not the R stage.

3. The vehicle according to claim 1, wherein the controller is configured to:
control the driver to set a preset distance between the partition wall and the active speaker on a central axis of the active speaker when the transmission position of the vehicle is a R stage; wherein the preset distance is at least ¼ wavelength of the lowest frequency of the virtual engine sound.

4. The vehicle according to claim 1, wherein the controller is configured to:
control the driver to set a preset distance between the partition wall and the front surface of the housing when the transmission position of the vehicle is a R stage, wherein the preset distance is equal to or less than ¼ wavelength of the highest frequency of the virtual engine sound.

5. The vehicle according to claim 1, wherein the controller is configured to:
control the driver to narrow a gap between the passive radiator and the active speaker when the vehicle speed is equal to or less than a preset speed; and
control the driver to widen the gap between the passive radiator and the active speaker when the vehicle speed is greater than the preset speed.

6. The vehicle according to claim 1, wherein the controller is configured to:
control the driver to set a preset distance between the partition wall and the active speaker on a central axis of the active speaker when the vehicle speed is equal to or greater than a preset speed, wherein the preset distance is at least ¼ wavelength of the lowest frequency of the virtual engine sound.

7. The vehicle according to claim 1, wherein the controller is configured to:
control the driver to set a preset distance between the partition wall and the front surface of the housing when the vehicle speed is equal to or greater than a preset speed, wherein the preset distance is equal to or less than ¼ wavelength of the highest frequency of the virtual engine sound.

8. The vehicle according to claim 1, further comprising:
a transfer rail installed inside the housing and configured to move the partition wall based on power transmitted from the driver; and
a holder, wherein a first end of the holder is rotatably fixed to the partition wall and a second end of the holder is rotatably fixed to the inside of the housing.

9. The vehicle according to claim 1, further comprising:
a transfer rail installed inside the housing; and
a holder configured to lift the partition wall based on the power transmitted from the driver, wherein a first end of the holder is rotatably fixed to the partition wall and a second end of the holder is rotatably fixed to the inside of the housing.

10. The vehicle according to claim 1, wherein the partition wall has a thickness of at least 10 mm.

11. A control method of a vehicle comprising:
moving and rotating a partition wall based on at least one of a transmission position of the vehicle and a vehicle speed, wherein the vehicle comprises:
a housing;
a passive radiator disposed on a rear surface of the housing;
an active speaker disposed on a front surface of the housing and configured to output a virtual engine sound; and
the partition wall disposed inside the housing, wherein a first side of the partition wall is in contact with a left side surface of the housing and a second side of the partition wall is in contact with a right side surface of the housing.

12. The control method according to claim 11, wherein moving and rotating the partition wall comprises:
when the transmission position of the vehicle is a R stage, moving and rotating the partition wall to narrow a gap between the passive radiator and the active speaker; and
when the transmission position of the vehicle is not the R stage, moving and rotating the partition wall to widen the gap between the passive radiator and the active speaker.

13. The control method according to claim 11, wherein moving and rotating the partition wall comprises:
when the transmission position of the vehicle is a R stage, moving and rotating the partition wall to set a preset distance between the partition wall and the active speaker on a central axis of the active speaker, wherein the preset distance is at least ¼ wavelength of the lowest frequency of the virtual engine sound.

14. The control method according to claim 11, wherein moving and rotating the partition wall comprises:
when the transmission position of the vehicle is a R stage, moving and rotating the partition wall to set a preset distance between the partition wall and the front surface of the housing, wherein the preset distance is equal to or less than ¼ wavelength of the highest frequency of the virtual engine sound.

15. The control method according to claim 11, wherein moving and rotating the partition wall comprises:
when the vehicle speed is equal to or less than a preset speed, moving and rotating the partition wall to narrow a gap between the passive radiator and the active speaker; and
when the vehicle speed is greater than the preset speed, moving and rotating the partition wall to widen the gap between the passive radiator and the active speaker.

16. The control method according to claim 11, wherein moving and rotating the partition wall comprises:
when the vehicle speed is equal to or greater than a preset speed, moving and rotating the partition wall to set a preset distance between the partition wall and the active speaker based on a central axis of the active speaker, wherein the preset distance is at least ¼ wavelength of the lowest frequency of the virtual engine sound.

17. The control method according to claim 11, wherein moving and rotating the partition wall comprises:
when the vehicle speed is equal to or greater than a preset speed, moving and rotating the partition wall to set a preset distance between the partition wall and the front surface of the housing, wherein the preset distance is equal to or less than ¼ wavelength of the highest frequency of the virtual engine sound.

18. The control method according to claim 11, further comprising:
providing power to a transfer rail that is installed inside the housing and configured to move the partition wall based on a power transmitted from a driver, wherein the vehicle further comprises a holder, a first end of the holder rotatably fixed to the partition wall and a second end of the holder rotatably fixed to the inside of the housing.

19. The control method according to claim 11, further comprising:
providing power to a holder that is configured to lift the partition wall based on power transmitted from a driver, wherein a first end of the holder is rotatably fixed to the partition wall and a second end of the holder is rotatably fixed to the inside of the housing, and
wherein the vehicle further includes a transfer rail installed inside the housing.

20. The control method according to claim 11, wherein the partition wall has a thickness of at least 10 mm.

* * * * *

UNITED STATES PATENT AND TRADEMARK OFFICE
CERTIFICATE OF CORRECTION

PATENT NO. : 11,872,936 B2
APPLICATION NO. : 17/306518
DATED : January 16, 2024
INVENTOR(S) : Jung Uk Noh It is certified that error appears in the above-identified patent and that said Letters Patent is hereby corrected as shown below:

In the Claims

In Column 12, in Claim 9, Line 6, delete "on the" and insert -- on --.

Signed and Sealed this
Thirtieth Day of April, 2024

Katherine Kelly Vidal
*Director of the United States Patent and Trademark Office*